(12) United States Patent
Murphy, Sr.

(10) Patent No.: US 8,991,558 B1
(45) Date of Patent: *Mar. 31, 2015

(54) LUBRICATION SYSTEM

(75) Inventor: Patrick J. Murphy, Sr., Frankfurt, IL (US)

(73) Assignee: Metco Engineering, Inc., Mokena, IL (US)

(*) Notice: Subject to any disclaimer, the term of this patent is extended or adjusted under 35 U.S.C. 154(b) by 388 days.

This patent is subject to a terminal disclaimer.

(21) Appl. No.: 11/937,940

(22) Filed: Nov. 9, 2007

Related U.S. Application Data (63) Continuation of application No. 10/774,847, filed on Feb. 9, 2004, now Pat. No. 7,313,956.

(51) Int. Cl.
*F01M 1/18* (2006.01)

(52) U.S. Cl.
CPC ..................................... *F01M 1/18* (2013.01)
USPC ................. 184/6.4; 184/108; 73/305; 73/309

(58) Field of Classification Search
USPC .............. 184/6.2–6.4, 108; 73/313, 305, 309, 73/307, 314, 322.5
See application file for complete search history.

(56) References Cited

U.S. PATENT DOCUMENTS

| | | |
|---|---|---|
| 548,240 A | 10/1895 | Williams |
| 727,779 A | 5/1903 | Frieseke |
| 1,110,752 A | 9/1914 | Dun |
| 1,171,800 A | 2/1916 | Muller |
| 1,294,265 A | 2/1919 | Hirsch |
| 1,302,350 A | 4/1919 | Foster |
| 1,990,716 A | 2/1935 | Stough |
| 2,050,686 A | 8/1936 | Wiggins |
| 2,074,959 A | 3/1937 | Guest |
| 2,282,771 A | 5/1942 | Wiggins |
| 2,282,774 A | 5/1942 | Wiggins |
| 2,489,461 A * | 11/1949 | Parrish .......................... 137/174 |
| 2,677,816 A | 5/1954 | Quist |
| 4,284,210 A * | 8/1981 | Horak ............................. 222/14 |
| 4,532,800 A | 8/1985 | Coleman |
| 4,552,090 A | 11/1985 | Coleman |
| 5,196,824 A | 3/1993 | Helm |
| 5,295,359 A * | 3/1994 | Reilly et al. ..................... 62/125 |
| 5,349,994 A * | 9/1994 | Koeninger ....................... 141/94 |
| 5,369,395 A | 11/1994 | Waller |

(Continued)

OTHER PUBLICATIONS

Lincoln, "Model No. 84629, Low Level Kit" Specification Sheet, Section C8, p. 205, Copyright 1987.

(Continued)

*Primary Examiner* — Robert A Siconolfi
*Assistant Examiner* — James Hsiao
(74) *Attorney, Agent, or Firm* — Banner & Witcoff, Ltd.

(57) ABSTRACT

The present invention is directed to lubrication system having a reservoir having a body. A follower is moveably disposed in the body. The system further comprises an alarm system having an electrical switch operably associated with the follower. The alarm generates a signal when the follower is at a predetermined location in the body. The alarm system may generate a signal when the follower is at a lower location in the body such as when the reservoir has an amount of lubricant representing a predetermined amount of usage time remaining. The alarm system may also generate a signal when the follower is at an upper location in the body such as when the reservoir is filled with lubricant wherein the signal acts to automatically interrupt the fill of lubricant.

11 Claims, 9 Drawing Sheets

(56) References Cited

U.S. PATENT DOCUMENTS

| | | | |
|---|---|---|---|
| 5,392,965 A * | 2/1995 | Azuma et al. | 222/396 |
| 5,609,193 A * | 3/1997 | Steckler | 141/231 |
| 5,812,060 A | 9/1998 | DeSpain et al. | |
| 5,927,142 A * | 7/1999 | Mercer | 73/296 |
| 6,067,854 A * | 5/2000 | Yang | 73/305 |
| 6,530,274 B1 | 3/2003 | Philbeck | |
| 6,601,738 B2 * | 8/2003 | Weigand et al. | 222/286 |
| 6,612,591 B1 * | 9/2003 | Watanabe | 280/4 |
| 6,988,406 B1 * | 1/2006 | Mack | 73/313 |
| 7,313,956 B1 * | 1/2008 | Murphy, Sr. | 73/313 |
| 7,484,409 B2 * | 2/2009 | Dykstra et al. | 73/319 |
| 8,141,421 B2 * | 3/2012 | Paine | 73/309 |
| 2003/0101811 A1 | 6/2003 | Philbeck | |

OTHER PUBLICATIONS

Lincoln Industrial Corp., Solutions Brochure, "FlowMaster Hydraulic Pump Rotary-Driven, Powerful and Versatile," Mar. 1999, vol. 1, No. 1.

Graco Inc., Instructions-Parts List, "Level Indicator, Part No. 244023," Copyright 2000.

Lincoln Industrial Corp., Solutions Brochure, "Airless Spray System," Dec. 2002, vol. 4., No. 1.

Lincoln Industrial Corp., Solutions Brochure, "Innovations in Pump Technology," Aug. 2003, vol. 5, No. 3.

Graco, Brochure Page for "24 Volt Lubrication Controller and Level Indicator," undated.

* cited by examiner

LUBRICATION SYSTEM

CROSS-REFERENCE TO RELATED APPLICATIONS

This application is a continuation of co-pending prior U.S. application Ser. No. 10/774,847, filed Feb. 9, 2004, which is expressly incorporated herein by reference and made a part hereof, and upon which a claim of priority is based.

FEDERALLY SPONSORED RESEARCH OR DEVELOPMENT

Not applicable.

TECHNICAL FIELD

The invention relates generally to a lubrication system for industrial equipment such as in a bearing dosage system, and more particularly to a grease reservoir that lubricates the fittings, joints and bearings of industrial construction or mining equipment such as loaders, excavators, crushers, and haul trucks.

BACKGROUND OF THE INVENTION

Lubrication systems are well-known in the art, and are generally used to deliver grease to locations on various types of equipment. For example, lubrication systems are used to deliver grease to industrial and mining equipment.

While the lubrication systems of the prior art provide a number of advantageous features, they nevertheless have certain limitations. As described herein, the present invention seeks to overcome certain of these limitations and other drawbacks of the prior art, and to provide new features not heretofore available.

SUMMARY OF THE INVENTION

The present invention provides a lubrication system including a reservoir suited for use in a bearing dosage system. The reservoir has a body, a top and a bottom. The body may be that of virtually any polyhedron. The body, the top and the bottom define the volume of the reservoir. The reservoir further comprises a passage through the body proximate to the bottom and a substantially planar follower moveably disposed in the body. The passage serves as an opening through which access may be gained to the interior of the reservoir and is used primarily for filling the reservoir with the desired lubricant such as grease. The follower has a configuration that conforms to the cross-sectional contour of the body. The system may also comprise a pump operably coupled to the reservoir. Examples of the pump are a hydraulic pump, air pump, electric pump or any other suitable pump. The pump delivers grease from the reservoir to remote equipment locations.

The reservoir further comprises an alarm system disposed proximate to the top. The alarm comprises an electrical switch operably associated with the follower and generates a signal when the follower is at a predetermined location in the body. The body further comprises an inner surface. In one embodiment, the follower has a circumferential lip that engages and preferably seals the inner surface of the body. The lip acts as a wiper or squeegee to remove lubricant from the inner surface of the body as the follower moves therein. The lubrication system also provides means for preventing the follower from abutting the bottom of the reservoir. In one embodiment of the lubrication system, the reservoir comprises an overflow passage through the body proximate to the top.

One benefit of the lubrication system is that the alarm generates a signal, such as an electrical signal or indication, when the follower is at a predetermined location in the body. The signal may be detected by any human sense. The signal is a warning, particularly a low-level warning or a high-level warning with respect to the level of the lubricant in the reservoir. The low-level warning is activated when the follower is at a predetermined lower location in the body wherein the reservoir has a predetermined amount of usage time remaining, such as a standard work shift, before the reservoir is substantially emptied or before the reservoir no longer operates normally. The high-level warning is activated when the reservoir is being filled by an external supply of lubricant wherein the follower reaches a predetermined upper location in the body wherein the signal acts to automatically interrupt the external lubricant supply. Generally, the alarm system generates a signal based on the position of the follower as the follower moves between two predetermined, or fixed points in the body.

It is understood that both the foregoing general description and the following detailed description, including the drawings, are exemplary and explanatory and are intended to provide further explanation of the invention as defined by the claims.

DETAILED DESCRIPTION

While this invention is susceptible of embodiments in many different forms, and will herein be described in detail, preferred embodiments of the invention are disclosed with the understanding that the present disclosure is to be considered as exemplifications of the principles of the invention and are not intended to limit the broad aspects of the invention to the embodiments illustrated.

Figure 1:
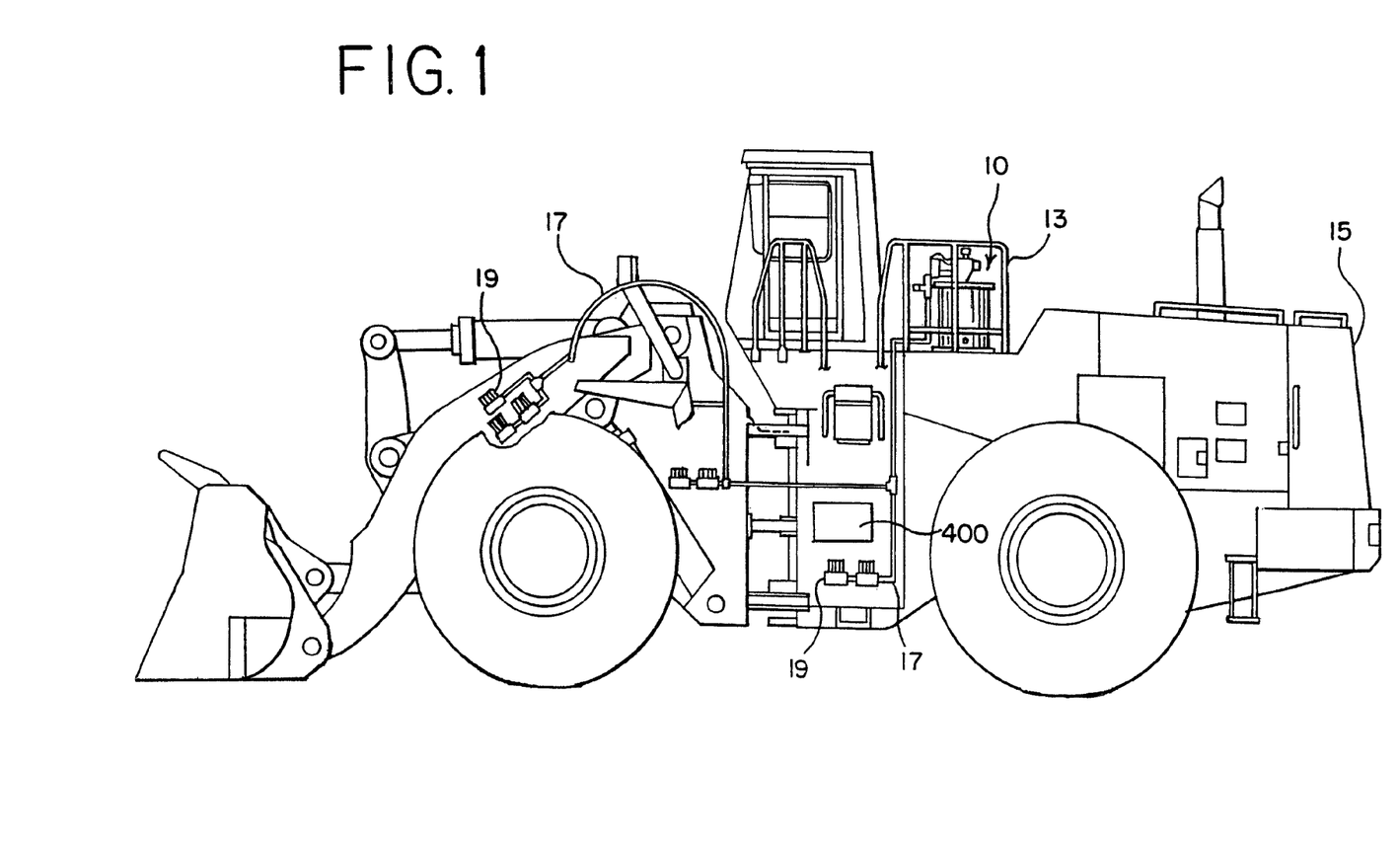
FIG. 1 is a side elevation view of a lubrication system mounted on a construction vehicle.

FIG. 1 is a side elevation view of a lubrication system 10 mounted on a construction vehicle 15. The lubrication system 10 generally includes a lubrication reservoir or tank 20, a pump assembly 30, and an alarm system 40, all of which can be seen in FIGS. 2 and 6 through 8. As one use of the invention, the lubrication system 10 comprises part of a bearing dosage system, and more particularly part of a lubricant metering device such as for delivering grease to the fittings, joints and bearings of industrial construction and mining equipment. As further shown in FIG. 1, the lubrication system 10 is operably connected to a plurality of conduits 17 mounted on the equipment. Injectors 19 are connected at distal ends of the conduits 17 and positioned (shown schematically) to inject a lubricant at various fittings, joints and bearings of the vehicle 15.

Figure 2:
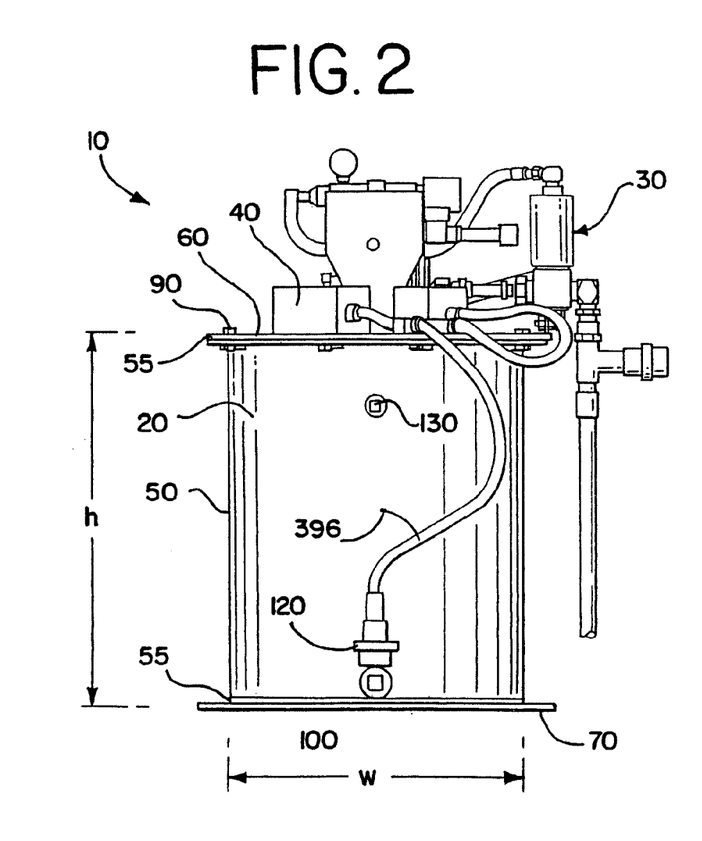
FIG. 2 is a side elevation view of an embodiment of a lubrication system of the present invention.

As shown in FIG. 2, the lubrication reservoir 20 is capable of holding a volume of grease. In one embodiment, the lubrication reservoir 20 generally comprises a body 50 having a top plate 60 and a bottom plate 70. The body 50, the top 60 and the bottom 70 generally define the volume of the reservoir 20, which is described in further detail below. The reservoir 20 also comprises a follower 80 (FIG. 6) disposed in the body. In one embodiment, the top 60 and the bottom 70 extend beyond the body 50, though that is not necessary because it is contemplated that the top 60 or the bottom 70, or both, may terminate with the body 50. The bottom 70 may also have a flange that includes mounting structure for attachment to the vehicle 15. The shape of the body 50 may be substantially cubic or substantially cylindrical. In the case where the body 50 is substantially cylindrical, then the top 60 and the bottom 70 may also be substantially cylindrical such that all three components would have a respective diameter, which need not be equal in all cases. Generally, it is recognized that the lubrication reservoir 20 can take many different forms, including that of virtually any polyhedron.

Figure 5:
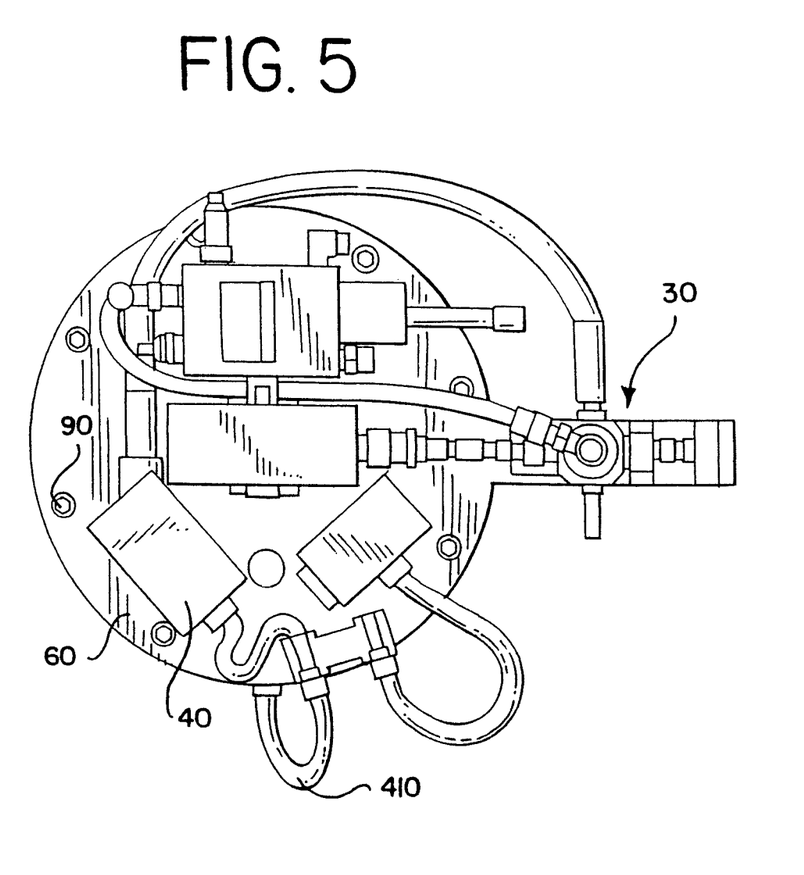
FIG. 5 is a top view of the lubricant system of FIG. 2.

The body 50, the top 60, and the bottom 70 each preferably comprise a metal or metal composite, including aluminum, mild steel or stainless steel, brass or any other suitable material. Other materials such as plastics are also possible. The top 60 and the bottom 70 may be connected to the body 50 by any suitable means known in the art, including without limitation, welds, bolts, screws and magnets. The body 50 may have a flange to cooperate with the top 60 for a suitable connection. The bottom 70 may be similarly connected or welded to the body 50 if desired. The top 60 is preferably removably attached to the body 50 so that the interior or cavity 25 of the reservoir 20 may be inspected, repaired or cleaned, if necessary. FIG. 5 shows the top 60 attached to the body 50 through a series of bolts 90. The reservoir 20 may further comprise a seal 55 (shown in FIG. 2) between the body 50 and the top 60, as well as between the body 50 and the bottom 70, where the seal comprises a suitable elastomeric material such as rubber. The purpose of the seal is to keep contaminants out of the reservoir 20, preferably making the reservoir 20 hermetic.

As further shown in FIG. 2, the reservoir 20 further has a fill port 100 through the body 50 proximate to the bottom 70. What is meant by proximate to the bottom 70 is that the fill port 100 is generally located on the lower half of the body 50 or on the bottom 70. In one embodiment, the fill port 100 is located approximately one inch from the bottom 70. The fill port 100 serves as an opening through which access may be gained to the interior or cavity 25 of the reservoir 20 and is used primarily for filling the reservoir 20 (described below) with the desired lubricant such as grease. In one embodiment, the size of the fill port 100 is from about one-half inch to about one inch and is a standard NPT threaded inlet with full coupling.

As further shown in FIG. 2, the reservoir 20 also has an overflow passage 130 through the body 50 proximate to the top 60. What is meant by proximate in this instance is that the overflow passage 130 is located such that communication from the inside to the outside of the reservoir 20 is provided through the top 60 or through the upper half of the body 50. The overflow passage 130 comprises a one-way check valve or solenoid valve, or any other suitable valve, such that communication is not provided from the outside to the inside of the reservoir 20. This design minimizes potential contamination of the contents inside the reservoir 20. In one embodiment, the overflow passage 130 is located about three inches from the top 60 of the reservoir 20 and comprises a one-half inch NPT threaded outlet with half-coupling. It is further understood that the reservoir 20 is vented by a vent hose or conduit as is known.

Figure 6:
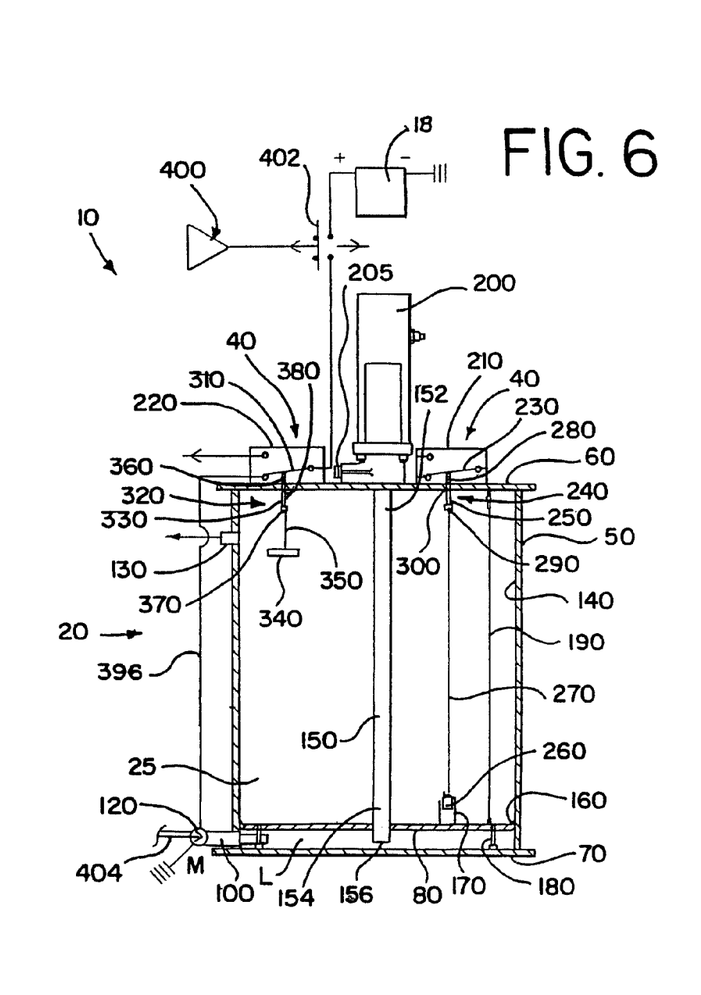
FIG. 6 is a cross-sectional view of the lubrication system of FIG. 2 showing a follower and an alarm system associated with the follower.

It is understood that the reservoir 20 could be dimensioned and constructed to hold any predetermined volume of lubricant. The body 50 has or defines an inner surface 140 (FIG. 6). The inner surface 140 of the body 50 aids in defining the volume of the reservoir 20 together with the top 60 and the bottom 70. In one preferred embodiment, such as shown in FIG. 2, the body 50 has a width w of approximately 15 inches, which may also be considered an inner diameter of the body 50. Also in the one preferred embodiment, the body 50 may have a height h of approximately 19¼ inches. With this height h and width w, the reservoir 20 has a volume of about 14.72 gallons or approximately 15 gallons. A reservoir 20 having such a volume may also be referred to as a 90 lb. reservoir. This preferred embodiment of the reservoir 20, where the reservoir 20 has a height h of about 19¼ inches and a width w of about 15 inches, results in a height/width ratio of the reservoir 20 of approximately 1.283. Also, in one preferred embodiment, the lowermost portion of the overflow passage 130 is located approximately 3½ inches from a top of the reservoir 20. Accordingly, as a follower 80 associated with the system 10 does not move past the overflow passage 130, the reservoir 20 has a "usable" height of approximately 15¾ inches. Therefore, the reservoir 20 has a usable volume of approximately 12.04 gallons. Finally, using the usable height, the reservoir has a usable height/width ratio of the reservoir 20 of approximately 1.05. Other embodiments of the lubrication system 10 may comprise a reservoir 20 having a height greater than or equal to about 15.0 inches, and a ratio of its height to width of less than or equal to about 1.3, preferably less than or equal to about 1.283.

Figure 3:
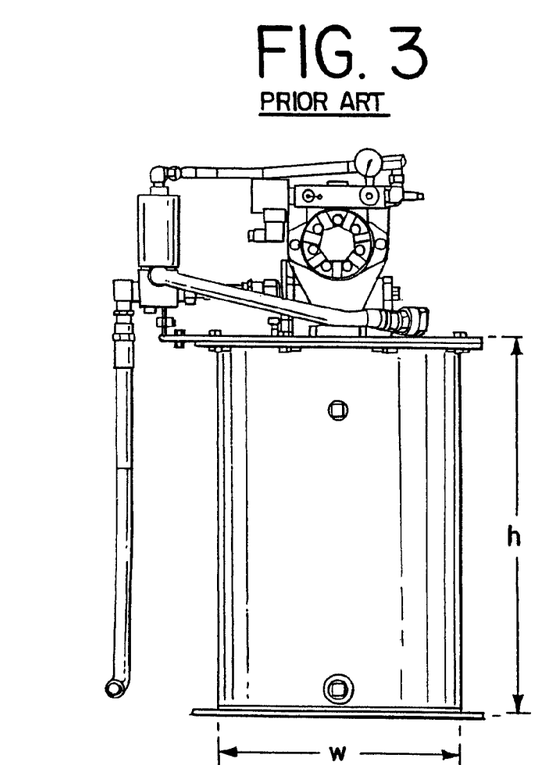
FIG. 3 is a side elevation view of a prior art lubrication reservoir.
Figure 4:
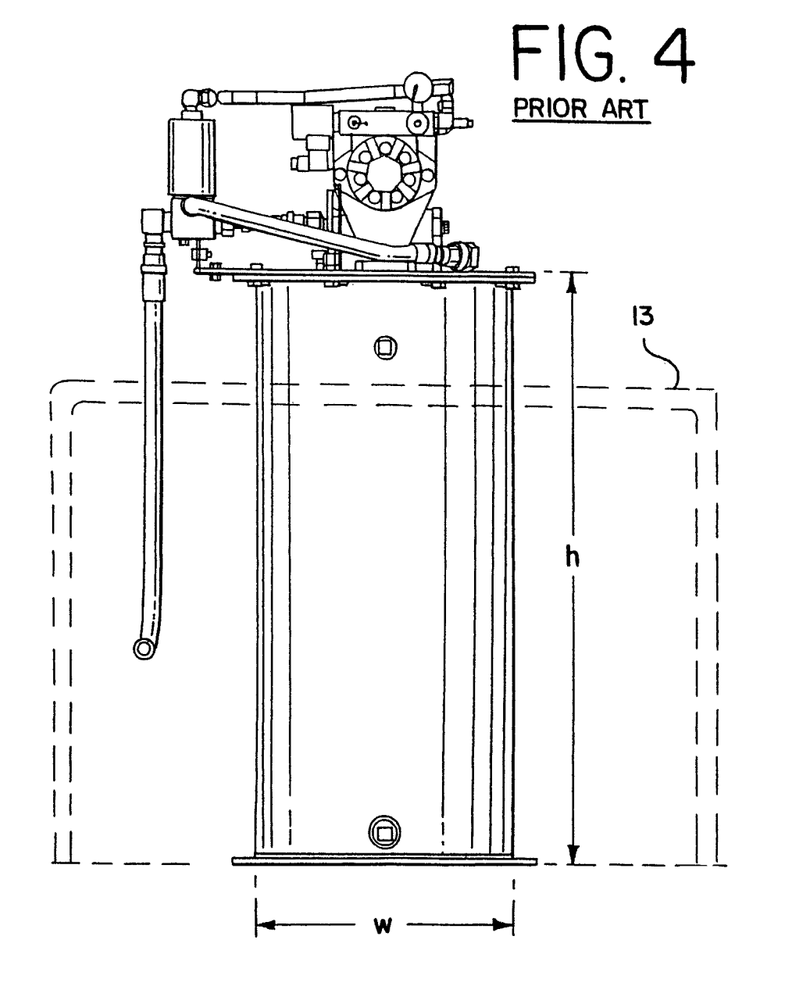
FIG. 4 is a side elevation view of another prior art lubrication reservoir.

FIGS. 3 and 4 show reservoirs of the prior art having different height/width ratios than that of FIG. 2. Referring to FIG. 3, the reservoir has a height of approximately 19.4 inches and a width of approximately 12 9/16 inches, resulting in a height/width ratio of 1.54. The reservoir of FIG. 3 has a volume of approximately 10.32 gallons. The reservoir of FIG. 3 may be referred to generally as a 60 lb. reservoir. The reservoir of FIG. 4 has a height of approximately 28 inches and a width of approximately 12 9/16 inches, and thus a height/width ratio of approximately 2.23. The reservoir of FIG. 4 has a volume of approximately of 15 gallons. The reservoir of FIG. 4 may be referred to generally as a 90 lb. reservoir. It is understood that the reservoirs shown in FIGS. 3 and 4 also have usable volumes that are reduced respectively from the volumes discussed above, as it is understood that the followers in these reservoirs also do not move all the way to the top of the reservoir body.

As discussed, the one preferred embodiment of the reservoir 20 of FIG. 2 results in a reservoir 20 having a shorter height h yet a greater width w than other reservoirs, such as those shown in FIGS. 3 and 4. This improved design increases the field of vision for the user or operator, particularly the operator of industrial loaders, excavators, crushers, and haul trucks such as the construction vehicle 15 shown in FIG. 1. For example, as can be appreciated from FIG. 1, the lubrication system 10, utilizing the reservoir 20 of FIG. 2, does not extend vertically past the guardrails 13 on the vehicle 15. The reservoir 20 also includes the preferred 90 lb. volume. It is generally desirable to have an increased volume so that refills of the reservoir are required less frequently. The reservoir shown in FIG. 3, when mounted on the vehicle 15 also would have a height less than the guardrails 13. This reservoir, however, is only a 60 lb. reservoir, thus less than the volume of the reservoir 20 of FIG. 2. The reservoir of FIG. 3 requires more frequent refills in operation. FIG. 4 shows the prior art reservoir having an increased 90 lb. volume. However, when the reservoir of FIG. 4 is mounted on the vehicle 15, the reservoir extends past the guardrails 13 as shown in FIG. 4, and can be appreciated from FIG. 1. This is undesirable as it decreases an operator's field of vision.

As stated above, the reservoir 20 further comprises a follower 80 that is circumjacent to the body 50. As shown in FIGS. 6 through 9, the follower 80 is moveably disposed in the body 50 and moves between an upper position and a lower position, or two fixed points within the body 50. In one embodiment, the follower 80 moves along a generally central axis inside the reservoir 20. The follower 80 may be substantially planar, and is preferably solid and inflexible. What is meant by solid is that the follower 80 is substantially, and preferably completely, devoid of an internal cavity. Other follower configurations are possible as is known. What is meant by inflexible is that the follower 80 has a mechanical modulus of elasticity greater than or equal to about 10,000 psi when measured according to ASTM E-8 for metals and ASTM D-638 for plastics. The follower 80 is comprised of any suitable material such as aluminum or stainless steel, and preferably has a length (in the case of a substantially cubic body) or a diameter (in the case of a substantially cylindrical body) that is near or slightly less than the same value as the corresponding measurement found in the body 50. The follower 80 preferably has a configuration that conforms to the cross-sectional contour of the body 50. It is noted that the follower 80 is constructed from a material and dimensioned accordingly, such that the follower 80 seals the grease within the body 50 from an outside environment and causes a partial vacuum in the area of the body 50 below the follower 80 when grease is pumped from the reservoir 20 by the pump assembly 30.

As further shown in FIG. 6, the follower 80 may further comprise a circumferential lip 160, which is adapted to engage the inner surface 140 of the body 50. What is meant by circumferential is that the lip 160 is disposed on at least one point at the external boundary or perimeter, or close thereto, of the follower 80. The lip 160 is preferably disposed around the entire periphery of the follower 80. The lip 160 is made from any suitable material, such as elastomers. In one preferred embodiment, the lip is made from Buna-N material. It is understood that other inert materials may also be used. The lip 160 serves as a wiper or squeegee to remove any, and preferably the majority of, lubricant from the inner surface 140 of the body 50 as the follower 80 moves in the body 50. It is further understood that the follower 80 generally seals the grease within the body 50. As will be discussed in greater detail below, as the pump assembly 30 pumps grease from the body 50, a partial vacuum is developed within the portion of the body 50 containing the grease.

The follower 80 has a first receiving sleeve 170 disposed on a side proximate to a top portion 65 of the body 50. The first receiving sleeve 170 is preferably made of aluminum or stainless steel and is permanently attached to the follower 80 by any known means, such as by welding. The first receiving sleeve 170 may comprise at least two opposing walls but may be substantially circular in shape as well. The first receiving sleeve 170 cooperates with a portion of the alarm system 40, as will be described in greater detail below.

The reservoir 20 may further comprise means for preventing the follower 80 from abutting the bottom 70. As shown in the FIGS. 6 through 9, the preventing means may be a stem 180 disposed on the follower 80, or a cable 190 that connects the follower 80 to the top 60. Other examples contemplated for the preventing means, which are not shown, include a stem disposed on the bottom 70 or a stem disposed on the inner surface 140 of the body 50. Other structures that could cooperate with the follower 80 are possible. The preventing means is made from any suitable material such that it prevents the follower 80 from abutting the bottom 70. The cable 190 also assists in maintenance of the system 10 when the follower 80 may be lifted out of the body 50. In this case, the follower 80, pump assembly 30 and alarm system 40 may be lifted out of the body 50 as an assembly or contained unit.

As also shown in FIGS. 6 through 9, the lubrication system 10 further comprises the pump assembly 30. The pump assembly 30 preferably comprises a pump 200 with a central pump shaft 150. The pump 200 is operably connected to the reservoir 20. The central pump shaft 150 has a first end 152 defining an exit aperture 205, and a second end 154 defining a lubricant inlet 156. The pump 200 pumps the lubricant L from the reservoir 20, through the inlet 156 at the second end 154, then through the central pump shaft 150 towards the first end 152, then through the exit aperture 205 and to a predetermined location. The exit aperture 205 may be located anywhere on the reservoir 20. It is understood that the reservoir 20 has a suitable aperture to accommodate the pump assembly 30. In one preferred embodiment, the top 60 has an aperture to accommodate the pump shaft 150. The follower 80 also has an aperture to accommodate the pump shaft 150. In a contemplated use for the reservoir 20, the predetermined location is the injector 19 at the joints or bearings of industrial equipment, particularly industrial construction or mining equipment, and more particularly loaders, excavators, crushers, and haul trucks. Although the figures show the pump 200 coupled to the top 60 of the reservoir 20, it is contemplated the pump 200 could be side-mounted to the body 50 of the reservoir, or mounted underneath the reservoir 20 at its bottom 70, or even inside the reservoir 20. It is also understood that the reservoir 20, as shown in the figures, is properly vented as is known. It is further understood that in the lubrication system 10 of the present invention, the pump 200 is not necessary wherein lubricant can be transferred from the reservoir 20 by other transfer means.

Provided that a suitable connection was used, the pump 200 could be operably associated with the reservoir 20 from any distance. The type of the selected pump, such as a hydraulic pump, an air pump or electrical pump depends on, among other things, the intended use of the reservoir 20. The selection may also depend on the contour (e.g., drum, canister, pail, cube, container, and the like) of the reservoir 20.

Figure 6A:
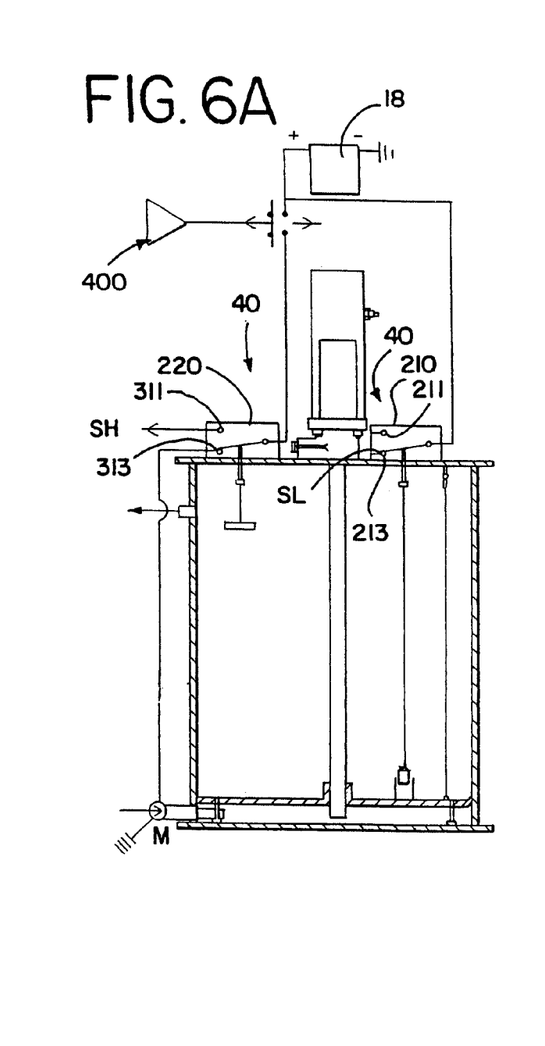
FIG. 6A is a cross-sectional view of the lubrication system of FIG. 6 showing two alarms operably associated with a single power source.

As stated above, the lubrication system 10 further comprises an alarm system 40, which comprises one or more alarms. Each alarm is preferably powered by a suitable power source. In one preferred embodiment, the alarm system 40 is connected to a battery 18 associated with the construction vehicle 15 such as shown in FIG. 1. Where the lubrication system 10 comprises more than one alarm, the alarms may be connected to the battery 18 by suitable electrical connections as is known in the art. FIG. 6A shows an embodiment of the reservoir 20 of the present invention with a first alarm 210 and a second alarm 220 both connected (shown generally schematically) to the same battery 18, though each alarm 210,220 may have a separate power supply. It is also understood that the alarms 210,220 are suitably grounded as is known. The alarm system 40 may comprise a plurality of different types of alarms to indicate various operational parameters of the system 10. For example, the alarm system 40 may comprise a low-level alarm 210 or a high-level alarm 220 with respect to the level of lubricant in the reservoir 20. The alarm system may generate a signal when the follower is at a predetermined location in the body. Such predetermined location could be a lower position or an upper position. In one preferred embodiment, the lower predetermined position is not a follower position represented by an empty reservoir 20.

In one embodiment shown in FIGS. 6 through 9, the alarm system 40 comprises a first alarm 210 and a second alarm 220, both operably associated with the follower 80. The first alarm 210 generates a low-level warning when the reservoir 20 has a predetermined amount of usage time remaining. The second alarm 220 generates a high-level warning when the reservoir 20 is full or has a predetermined fill volume remaining. Other alarms are possible that are indicative of different parameters of operation of the reservoir 20 or the lubrication system 10. As is understood and will be described in greater detail below, the follower 80 generally rests on the top portion of the lubricant L contained in the reservoir 20. As discussed, the follower 80 defines a sealed environment in this portion of the body 50. As the level of lubricant changes in the reservoir 20, the follower 80 moves within the reservoir 20 along with the level of the lubricant L. Thus, as lubricant L is pumped from the reservoir 20, the follower 80 moves along the body 50 towards a lower portion of the body 50. When the follower 80 is at a predetermined location in the body 50 towards the lower portion of the body 50, the first alarm 210 indicating a low lubricant level will be activated. When the reservoir 20 is filled with lubricant L, the follower 80 moves along the body 50 towards an upper portion of the body 50. When the follower 80 is at predetermined location in the body 50 towards the upper portion of the body 50, the second alarm 220 indicating a high-level will be activated. As described in greater detail below, the supply of lubricant filling the reservoir 20 will be automatically interrupted.

The first alarm 210 may comprise an electrical switch 230 operably connected to the follower 80 to indicate a low-level of lubricant in the reservoir 20. The first alarm 210 may also generate a signal, such as an electrical indication, when the follower 80 is at a predetermined location in the body 50. As further shown in FIGS. 6 through 9, the first alarm 210 is disposed on the reservoir 20 proximate to the top 60. What is meant by proximate to the top 60 is that the first alarm 210 is located on the top 60 or on the upper half of the body 50. It is preferably that the first alarm 210 is located generally on top of the reservoir 20. Other locations are possible as can readily be understood from the present disclosure. In one preferred embodiment, the first electrical switch is a single-pole, double-throw switch. Other types of switches are also possible. In this embodiment, the first electrical switch 230 has an open contact 211 and a closed contact 213. The electrical switch 230 is operably connected to the follower 80 by a first biasing assembly 240. The first biasing assembly 240 generally includes a first spring-loaded rod 250 and a weight assembly having a first weight 260 and a first cable 270. The spring-loaded rod 250 is adapted to engage the electrical switch 230. The first cable 270 has one end connected to the rod 250 and another end connected to the first weight 260. The first cable 270 may comprise any suitable material such as an elastomer, a spring, a metal or a metal composite chain. The first rod 250 may also be considered as part of the first switch 230. The first spring-loaded rod 250 is spring-loaded by a spring 280 that is generally positioned on the rod 250 between the top 60 and the electrical switch 230. The first cable 270 is connected to the spring-loaded rod 250 by a ring 290. Preferably, the rod 250 passes through an aperture 300 in the top 60 such that the rod 250 may pass through the aperture 300 but the spring 280 cannot. The first weight 260 hangs from the cable 270 into the body 50 and is generally positioned in the first receiving sleeve 170. A keeper ring may be included with the sleeve 170 to maintain the first weight 260 within the sleeve 170 if the follower 80 is removed from the body 50 such as during maintenance. In certain positions, the first weight 260 rests on and moves with the follower 80. Operation of the first alarm 210 will be described below.

Figure 12:
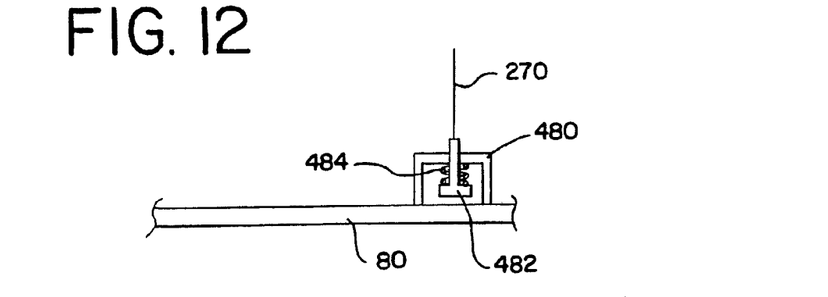
FIG. 12 is a partial schematic view of an alternative embodiment of a low-level alarm of the present invention.

In an alternative embodiment shown in FIG. 12, the weight assembly may have different structure. For example, a box-type retainer 480 may be connected to the top surface of the follower 80. The retainer 480 receives a bar-shaped member 482 that is biased within the retainer 480. As further shown in FIG. 12, a retainer spring 484 is mounted between a surface on the bar member 482 and an inner surface of the retainer 480. A distal end of the bar member 482 is connected to the cable 270. The retainer spring 484 is selected such that it provides sufficient resistance as the follower 80 is lowered in the body 20 wherein the low-level alarm 210 is activated when the follower 80 reaches the predetermined location. As shown in FIG. 12, once the alarm 210 is activated, it is understood that the follower 80 can still move as the bar member 482 can still move within the retainer 480 wherein the retainer spring 484 is compressed on further movement of the follower 80. The amount of play between the bar member 482 and retainer 480 can be dimensioned as desired.

As further shown in FIGS. 6-10, the lubrication reservoir 20 may further comprise a second alarm 220, which is also capable of generating a signal, such as an electrical indication, like the first alarm 210. In one embodiment, the second alarm 220 is operably associated with the follower 80 and generates a high-level warning when the reservoir 20 is full or has a predetermined fill volume remaining. The second alarm 220 may comprise a second electrical switch 310. Like the first alarm 210, the second alarm 220 is also disposed on the reservoir 20 proximate to the top 60.

In one embodiment, the second electrical switch 310 is operably connected to the follower 80 by a second biasing assembly 320. The second electrical switch has a closed contact 311 and an open contact 313. The second biasing assembly 320 generally includes a second spring-loaded rod 330 and a second weight assembly including a second weight 340 interconnected by a second cable 350. The second spring-loaded rod 330 is adapted to engage the second electrical switch 310. The second cable 350 may comprise the same material as the first cable 270. The second spring-loaded rod 330 is spring-loaded by a second spring 360 that is generally positioned on the second rod 330 between the top 60 and the second electrical switch 310. The second cable 350 is connected to the second rod 330 by a second ring 370. Preferably, the second rod 330 passes through a second aperture 380 in the top 60 such that the second rod 330 may pass through the second aperture 380 but the second spring 360 cannot. The second weight 340 hangs from the second rod 330 by the second cable 350 and into the body 50. The second rod 330 may be considered as part of the second switch 310. In one embodiment shown in FIG. 9, the follower 80 may have a second receiving sleeve 390 on a side proximate to the top 60 that is adapted to receive the second weight 340.

Preferably, the second alarm 220 is operably associated with a valve 120, or shut-off valve 120. The valve 120 is connected in fluid communication with the fill port 100. The valve 120 controls the selective opening and closing of the port 100. In one preferred embodiment, the shut-off valve 120 is a solenoid valve that is electrically connected to the second electrical switch 310 via an electrical connector 396. Other types of valves could also be utilized. As further shown in FIG. 6, a fill switch is included between the second electrical switch 310 and the battery 18. A fill conduit may be connected to the valve 120. The fill switch and fill conduit may be considered to comprise components of a fill station 400. The fill station 400 could be integrally mounted on a vehicle 15 in one preferred embodiment. The fill station 400 and associated components will be described in greater detail below.

One benefit of the reservoir 20 is that both the first alarm 210 and the second alarm 220 are capable of generating a signal. The signal may be audible, visual or felt, or detected by any human sense. What is meant by felt is that the signal is generated in a manner that is detected by the sense of touch, such as where the signal is a vibrating element. It is contemplated that any given signal may be detectable by two or more senses. According to one embodiment, the signal is a warning, particularly a low-level warning or a high-level warning with respect to the level of the lubricant in the reservoir 20. If the high-level warning signal is generated, particularly during refilling of the reservoir 20, the present invention provides for automatically stopping the refilling process. A signal may be detected at a place other than proximate to the reservoir 20 such as inside the operator's cab of the construction vehicle 15.

In one embodiment, the signal is a low-level warning that represents that the reservoir 20 contains an amount of lubricant representing a predetermined amount of usage time remaining before the reservoir 20 is substantially emptied or before it will no longer operate normally. The predetermined amount of usage time remaining is preferably a length of time of a work shift. The amount of usage time could be any finite period of time including a minute. In other embodiments, the predetermined amount of usage time remaining is at least five minutes, at least thirty minutes, preferably at least one hour, more preferably at least six hours, more preferably at least twelve hours, and even more preferably at least twenty-four hours. In yet other embodiments, the predetermined amount of usage time remaining could be any number of minutes, hours or days, or even the length of a work shift. The predetermined amount of usage time remaining will vary depending on the volume of the reservoir 20, as well as the rate of use.

Preferably, the reservoir 20 will continue to operate in the same manner before and after a signal is generated until an event occurs that inhibits normal operation such as depletion of the lubricant supply or cavitation of the pump. It is understood that the components of the alarm system can be structured in varying dimensions, for example, to vary the desired predetermined amount of usage time. In one example, the cable 270 can be shortened wherein the low-level alarm 210 may be activated when the follower 80 is at a higher position in the body 50. In such case, the predetermined amount of usage time will generally be increased, as a greater amount of lubricant L will be present in the body 50 when the alarm 210 is activated.

The signal may also be a high-level warning that represents that the reservoir is full or has a predetermined fill volume remaining. The predetermined fill volume remaining may be any value of the reservoir's volume between the reservoir 20 being completely emptied or completely filled. In one embodiment, the predetermined fill volume remaining represents the volume remaining in the reservoir 20 that may be displaced with lubricant before the reservoir 20 is substantially filled, will be overfilled, or before the reservoir 20 will no longer operate normally. The second alarm 220 will automatically interrupt flow of an external supply of lubricant L as described below. It is understood that the components of the high-level alarm system can also have varying dimensions, for example, to adjust when the high-level alarm is activated.

Figure 10:
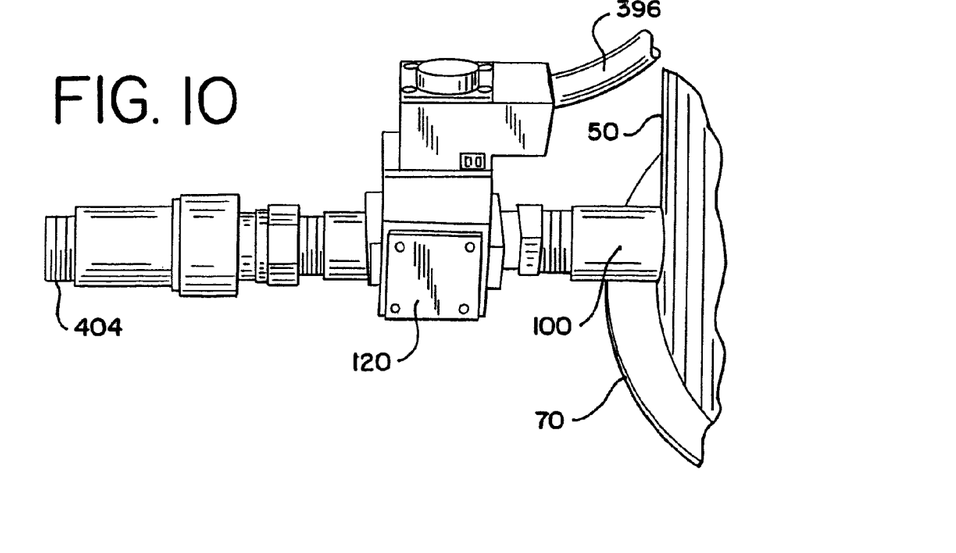
FIG. 10 shows a shut-off valve coupled to a passage disposed on the reservoir of FIG. 2.
Figure 11:
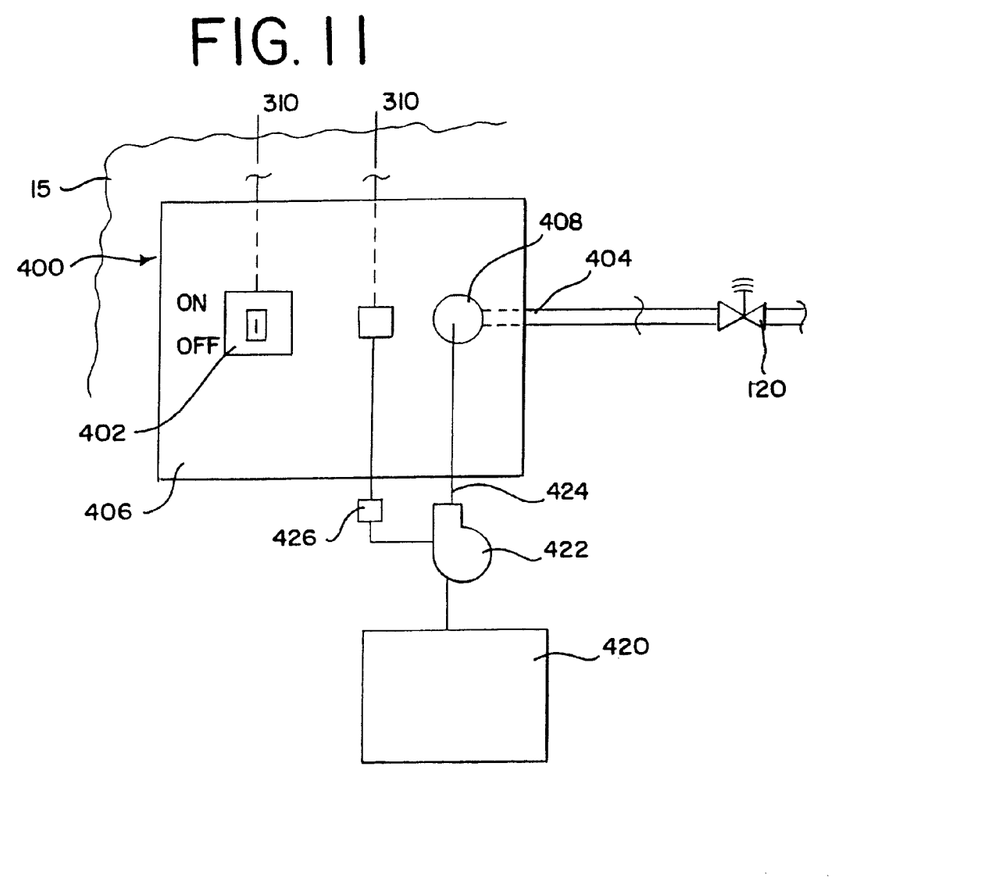
FIG. 11 shows a basic schematic of a fill station on a construction vehicle such as is shown in FIG. 1, the fill station adapted to be operably coupled to the lubrication reservoir.

FIG. 11 shows a basic schematic of a fill station 400. In one preferred embodiment, the fill station 400 will be integrally mounted on the construction vehicle 15 to provide for easier refilling of the reservoir 20 as will be described in greater detail below. The fill station 400 generally includes a fill switch 402 and a fill conduit 404. As previously discussed, the fill switch 402 is electrically connected between the battery 18 and the second electrical switch 310 associated with the second alarm 220. As part of the fill station 400, the fill switch 402 is mounted on a panel 406 mounted on the vehicle 15 (FIG. 1). The fill conduit 404 has an inlet coupler 408 that is mounted on the panel 406. A distal end of the fill conduit 404 may be connected to the valve 120 by any suitable connection including a quick disconnect type connector (FIG. 10) known in the art. The fill conduit 404 can be mounted on the vehicle 15.

As will be described in greater detail below and further shown in FIG. 11, the fill station 400 cooperates with an external supply of lubricant L. The external supply of lubricant L may be part of a lubricant supply vehicle and include a lubricant reservoir 420 and a supply pump 422. The supply pump 422 has an outlet conduit 424 that is adapted to connect to the inlet coupler 408 of the fill conduit 404. The supply pump 422 can also include an electrical switch 426 that can be plugged into an optional receptacle on the panel 406 that could be operably connected to the switch 310. The overall operation of the fill station 400 and external lubricant supply will be described in greater detail below.

Figure 7:
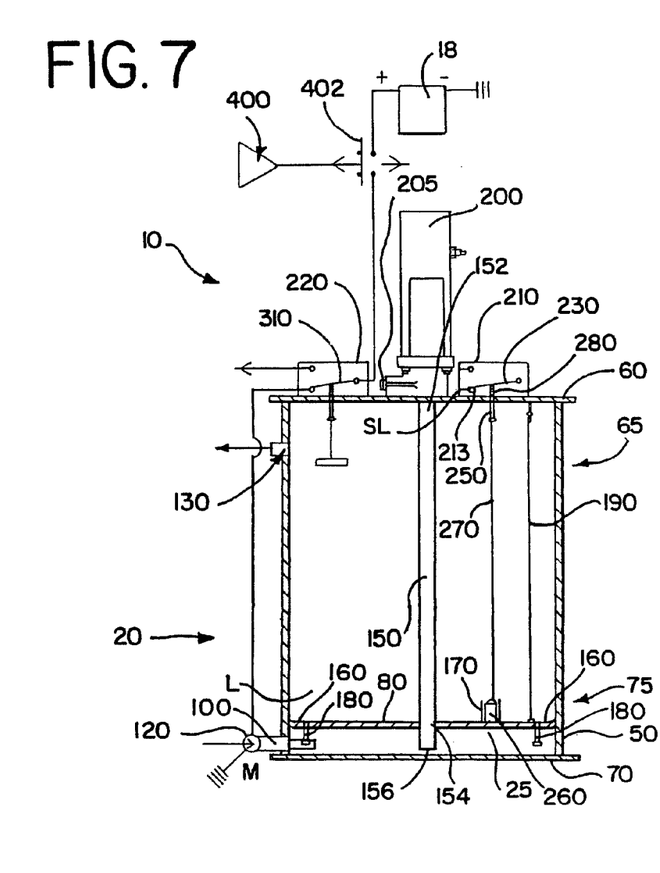
FIG. 7 is a cross-sectional view of the reservoir of the lubrication system of FIG. 6 where the follower is in a higher position relative to FIG. 6.
Figure 8:
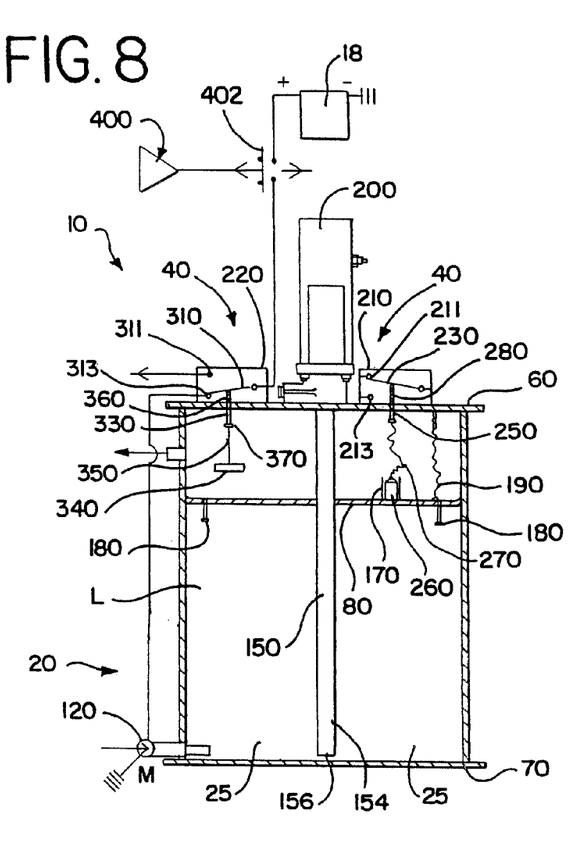
FIG. 8 is a cross-sectional view of the reservoir of the lubrication system of FIG. 6 where the follower is in a higher position relative to FIG. 7.
Figure 9:
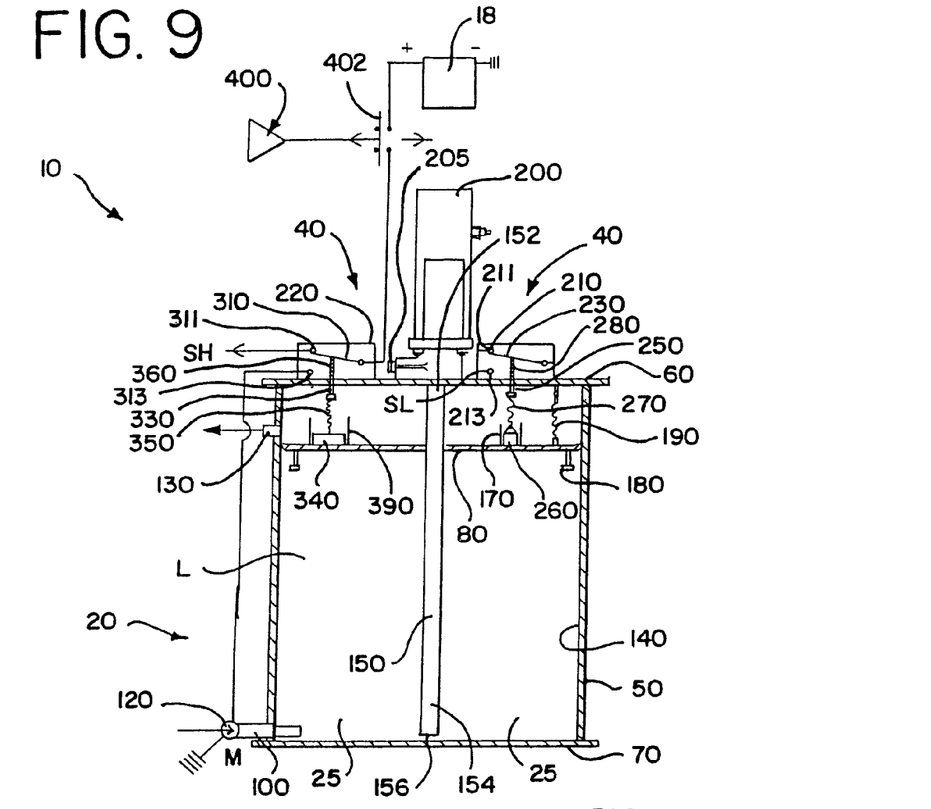
FIG. 9 is a cross-sectional view of the reservoir of the lubrication system of FIG. 6 where the follower is in a higher position relative to FIG. 8.

Referring generally to FIGS. 6-11, the operation of the lubrication system 10 will now be described. In one preferred form of the invention, the lubrication reservoir 20 may be pre-filled with a full supply of lubricant L such as grease at the factory where the system 10 is initially fabricated. The system 10 is then installed on, for example, the construction vehicle 15 as shown in FIG. 1. The appropriate connections are made such as the pump outlet 205 to the supply conduits 17. Injectors 19 are connected at distal ends of the conduits 17 and positioned to inject the lubricant L at various fittings, joints and bearings of the vehicle 15. Other connections are also made such as the fill conduit 404 to the fill valve 120, as well as the necessary electrical connections. In this condition, the level of lubricant L in the reservoir may be as shown in FIG. 9, wherein the follower 80 rests on the level of lubricant L at generally an upper position in the body 50. The low-level alarm 210 is in an open position. The high-level alarm is in a closed position and the fill switch 402 is in an open or "Off" position. There exists significant slack in the first cable 270 and the second cable 350 in this position. The first weight 260 and the second weight 340 rest and are supported on the top surface of the follower 80. As previously discussed, the follower 80 seals the lubricant L in the body 50.

As further shown in FIG. 9, the first alarm 210 remains inactivated with the first electrical switch 230 in an open position, i.e. positioned against the open contact 211. In this general condition, the first spring 280 has an uncompressed length of about two and three-quarters inches. With respect to the second alarm 220, the follower 80 is at a predetermined location within the body 50 to cause the second spring-loaded rod 330 to engage the second electrical switch 310 and maintain the second electrical switch 310 to a closed position, i.e. positioned against the closed contact 311. While the contact 311 is considered a closed contact, it represents the contact of the switch 310 that when the switch 310 moves to this contact 311, a signal SH is generated indicating a high-level warning. This will be described in greater detail below. It is understood that the open/closed nomenclature with respect to the switches may be reversed without altering the operation of the system 10. As also shown in the system condition of FIG. 9, there is no electrical communication between the battery 18 and the fill valve 120. As the fill valve 120 is a normally closed valve, the valve 120 is closed in this condition.

In this initial condition, an operator can operate the vehicle 15 thus utilizing the lubrication system 10 in the course of this operation. As is known, the pump assembly 30 is activated as necessary to deliver lubricant L, preferably in the form of grease, to the injectors 19 at the various locations on the vehicle 15. As this is done, the level of lubricant L in the body 50 of the reservoir 20 decreases. As the follower 80 rests on a top surface of the lubricant L, the follower 80 moves along the body 50 from the upper position to lower positions. For example, FIG. 8 shows a condition of the reservoir 20 wherein lubricant L has been depleted and the follower 80 is lower than in FIG. 9. In this position, the low-level alarm 210 is not activated. There remains slack in the cable 270 and the first weight 260 remains supported by the follower 80. Accordingly, the first electrical switch 230 remains in an open position. Further in this position, the follower 80 has moved to a position wherein the high-level alarm 220 moves from its closed position to its open position. In this position, the follower 80 no longer supports the second weight 340. The second weight 340 therefore hangs from the second cable 350 wherein the second cable 350 is taut. The second weight 340 thus pulls the switch 310 from the closed contact 311 to the open contact 313. It is understood, however, that because the fill switch 402 remains in an open position, no electrical power is delivered through the switch 310 and to the fill valve 120. It is understood that as the pump assembly 30 pumps lubricant L from the body 50, a partial vacuum is developed in the body 50 below the reservoir.

As additional lubricant L is pumped from the reservoir 20, the follower 80 moves to a further lowered position in the body 50 such as shown in FIG. 7. In this particular position, the position of the electrical switch 310 of the high-level alarm 220 is unchanged from the position described above. When the follower 80 is lowered to a predetermined position within the body 50, such as shown in FIG. 7, the low-level alarm 210 moves from the open position to the closed position, thus activating the alarm 210. In particular, when the follower 80 reaches this predetermined position, the first cable 270 elongates a sufficient amount wherein the first cable 270 pulls the first rod 250, against the biasing force of the first spring 280, downwards. The first spring 280 is compressed to a length of approximately two inches. This downward force on the first rod 250 moves the switch 210 from the open position to the closed position wherein the switch 210 makes up the closed contact 213. When the contact 213 is made up by the switch 230, a signal SL is generated in the form of a low-level warning. This signal can be in suitable form as described above so that it is detected by the operator, such as a light and/or sound indication in the operator cab of the vehicle 15. The signal is an early warning such that it indicates to the operator that the reservoir 20 requires refilling shortly. Thus, activation of the low-level alarm 210 and generating the signal SL indicates that the reservoir 20 has a predetermined amount of usage time remaining. In other words, there remains in the reservoir 20 an amount of lubricant L that can be used for generally a predetermined amount of time. This is in contrast to other prior art low-level alarms that merely provide a low-level alarm when the reservoir is empty of lubricant L. In these prior art alarms, the follower is not further moveable in the body once the low-level alarm is activated.

As discussed, the low-level alarm 210 is activated when the follower 80 is at predetermined location in the body 50 which represents a predetermined about of lubricant usage time remaining. Thus, at this condition, the lubrication system 10 can still operate normally for the indicated usage time remaining. Normal operation is assured because in the present invention, the follower 80 can still move downwards as the pump assembly 30 continues to pump lubricant L from the reservoir 20. Movement of the follower 80 is essential for normal operation as it assures that lubricant L will be forced around the inlet 156 of the pump 200. If the follower 80 does not continue to move downwards and the pump 200 continues to pump lubricant L from the reservoir 20, voids can four within the amount of lubricant L in the reservoir 20. These voids can cavitate the pump 200 and result in air being introduced in the system 10. This can lead to complete system failure. As such, the follower 80 can still move downwards after the alarm 210 is activated because the first weight 260 is not permanently connected to the follower 80. As shown in FIG. 6, as the pump continues to pump lubricant L from the reservoir 20, the first weight 260 lifts off of the follower 80 and is suspended by the first cable 270. The first weight 260 moves relative to the sleeve 170, but is maintained within the sleeve 170. It is understood that the first weight 260 could be connected to the follower 80 that would still allow the follower 80 to move as in FIG. 6. For example, an elastic member could be provided between the first weight 260 and the follower 80. In addition, the first cable 270 itself could be formed of a material having sufficient elastic properties. Such connections would allow stretching of the member allowing further movement of the follower 80 even after the low-level alarm 210 was activated. As shown in FIG. 6, the follower 80 reaches its lowermost position as the stems 180 rest on the bottom plate 70 of the body 50. In this position, the first cable 270 is fully elongated. The first weight 260 remains within the sleeve 170 to assure proper readings. A structure such as a keeper ring may be used to assure that the first weight 260 remains within the sleeve 170. If the first weight 260 was not maintained within the sleeve 170, false low-level readings could result. The positioning cable 190 is also fully elongated.

The positioning cable 190 could minimize unwanted rotation of the follower 80 relative to the body 50, which could also lead to false low-level alarms.

As discussed, when the follower 80 moves to the predetermined location in the body 50 and the low-level alarm 210 is activated, it indicates to the operator that the reservoir 20 must be refilled shortly. In a preferred embodiment, there is an amount of lubricant L remaining in the reservoir 20 to cover normal usage of the system 10 for a regular work shift for the operator. This could be an eight-hour time frame or other time frame as desired. As can be seen in FIGS. 6 and 7 representing one preferred embodiment, the movement of the follower 80 from the time of low-level switch activation (FIG. 7) to when the follower is at its lowermost position (FIG. 6) is a relatively short distance. The components of the alarm 210 could be dimensioned to correlate to the desired time. The operator can then notify the appropriate personnel in charge of filling lubrication systems 10 on vehicles 15. As will be further understood from FIGS. 6-11, the lubrication reservoir 20 can then be filled from an external supply of lubricant L.

As shown in FIGS. 6, 10 and 11, a lubrication vehicle, having an external supply of lubricant, may be positioned next to the vehicle 15 where it can cooperate with the fill station 400 on the vehicle 15. As shown in FIG. 11, the external supply of lubricant is in the form of a larger lubrication tank 420 having the supply pump 422 in fluid communication with the tank 420. The supply pump 422 has the outlet conduit 424 that is first connected to the inlet coupler 408 of the fill conduit 404 of the fill station 400. This establishes a flow path between the external supply of lubricant to the fill conduit 404 and up to the fill valve 120. It is understood that the flowpath is properly primed. As previously described, it is understood that the second electrical switch 310 of the high-level alarm 220 remains making up the open contact 313 (i.e, closing the contact). As the fill switch 402 remains in the "Off" position, no power is provided to the fill valve 120 and, therefore, the fill valve 120 is closed. When the fill operator is ready to fill the reservoir 20, the operator turns the fill switch 402 to the closed or "On" position. As further shown in FIGS. 6, 10 and 11, this provides power from the battery 18 to the fill valve 120. This energizes and opens the fill valve 120 providing a fluid flow path into the reservoir 20.

The operator activates the supply pump 422 to begin delivering the external supply of lubricant L from the lubrication tank 420 to the reservoir 20. As lubricant L is pumped into the reservoir 20, the follower 80 rides on top of the lubricant level from the position shown in FIG. 6 to the position shown in FIG. 9. As shown in FIGS. 7 and 8, as the follower 80 moves upwards in the body 50, the follower 80 raises the first weight 260 thereby allowing the biased first rod 250 to move the first electrical switch 210 from the closed position to the open position. This eliminates the low-level alarm signal SL. The supply pump 422 continues to pump lubricant L into the reservoir 20 and the follower 80 is further raised towards a top of the body 50. As shown in FIG. 9, as the follower 80 continues to rise, the follower 80 supports the second weight 340 allowing slack to develop in the second cable 350. Accordingly, at this predetermined location at an upper location in the body 50 (and below the overflow opening 130), the biased second rod 330 moves the second electrical switch 310 to the closed position wherein the open contact 313 is broken and the closed contact 311 is made up by the switch 310. As a result, power from the battery 18 is removed from the fill valve 120 automatically closing the fill valve 120 and interrupting flow of the external supply of lubricant L into the reservoir 20. With the switch 310 making up the closed contact 311, a high-level warning SH is generated. The fill operator can then turn off the supply pump 422, disconnect from the fill station 400, and open the fill switch 402. Thus, it is understood that when the follower 80 is at a predetermined location in the body 50, generally at an upper portion of the body 50, the second electrical switch 310 of the high-level alarm 220 will generate a signal SH indicating a high-level lubricant condition. Simultaneously, the high-level alarm 220 will close the fill valve 120 interrupting the flow of lubricant L into the reservoir 20.

With the high-level alarm 220 activated and the fill valve 120 closed, the fill operator can then turn off the supply pump 422, and open the fill switch 402. In an alternative embodiment, the supply pump 422 can be equipped with the additional switch 426 that can be plugged into a suitable receptacle in the fill station 400 to be in communication with the second electrical switch 310 of the high-level alarm 220. In this configuration, when the second electrical switch 310 provides a high-level alarm signal SH, the supply pump 426 can also be automatically shut-off.

With the reservoir 20 now re-filled with a fresh amount of lubricant L, the system 10 and vehicle 15 can continue to be used as described above. When the pump 200 delivers enough lubricant L to create another low-level alarm signal SL, the reservoir 20 can again be refilled as just described. The reservoir 20 is well-suited for use with high-viscosity grease, including grease having a NLGI rating of 1 or softer or a cone penetration value in the range from about 310 to about 340 millimeters of penetration when measured in accordance with ASTM D 217. The use of the reservoir 20 is not limited to lubricants, as it is also contemplated that the reservoir 20 could be used for storing or delivering other bulk, preferably viscous, materials such as ink, pigment, and the like.

Also disclosed are methods for operating the lubrication system 10, particularly the lubrication reservoir 20. One method of operating a lubrication reservoir 20 comprises the step of filling the lubrication reservoir 20 with a lubricant. According to one method for the lubrication system 10, the alarm system 40 is capable of generating a signal that can be detected by a human. The signal represents a high-level warning that corresponds to the reservoir 20 having a predetermined fill volume remaining, or being filled to a certain level.

The method further contemplates that the high-level alarm, upon activation, automatically interrupts the filling of the reservoir 20 with lubricant L. Thus, in the method, filling of the reservoir is automatically stopped in response to the signal or high-level warning. That is, the alarm system 40 is configured to automatically interrupt the supply of lubricant L through the fill port 100 when the follower 80 is at a predetermined location in the body 50. In one embodiment, the second alarm 220 generates a signal that causes the shut-off valve 120 to automatically close the fill port 100, thereby stopping the filling of the reservoir 20.

The predetermined fill volume remaining may be any value of the reservoir's volume between the reservoir 20 being completely emptied or completely filled. In one embodiment of the method, the predetermined fill volume remaining represents the volume remaining in the reservoir 20 that may be displaced with lubricant before the reservoir 20 is substantially filled, will be overfilled, or before the reservoir 20 will no longer operate normally.

In one embodiment, the method may include automatically filling the reservoir 20. In such an embodiment, the alarm system 40 is configured to automatically start filling the reservoir 20 in response to a low-level alarm signal such as is generated by the first alarm 210, as described above. The automatic filling of the reservoir 20 would be continued until the high-level alarm signal is generated. In such a situation, a refill tank would be included on the vehicle, as well as appropriate valving, conduits and control system elements to achieve automatic filling.

Another method of operating a lubrication reservoir is provided where a step of the method comprises providing a reservoir 20 having body 50 abutting a top 60 and a bottom 70, a port 100 through the body 50 proximate to the bottom 70, a follower 80 moveably disposed in the body 50, and an alarm system 40 operably associated with the follower 80. The alarm system 40 is capable of generating a signal that may be detected by a human. The alarm system 40 may comprise the first alarm 210 or the second alarm 220, as described above. In another embodiment of the method, the reservoir 20 comprises both a first alarm 210 and second alarm 220, as described above.

Another step of the method is pumping a lubricant from the reservoir 20. A pump assembly 30, and more particularly a pump 200, pumps the lubricant from the reservoir 20 to a predetermined location, particularly the fittings and joints of a construction vehicle 15 as shown in FIG. 1. Still yet another step in the method is generating a signal that is detectable by a human. The alarm system 40 generates a signal that represents a low-level warning that corresponds to the reservoir 20 having a predetermined usage time remaining. After the signal is generated, the reservoir 20 will continue pumping lubricant L for a time period less than or equal to the predetermined amount of usage time remaining. The predetermined amount of usage time remaining is described above. In one embodiment, the predetermined amount of usage time remaining is least one hour. In another embodiment, the predetermined amount of usage time remaining is represented by a time length of a work shift such as eight hours. During this time, the operator can arrange for refilling.

It is further contemplated that the signals generated by the alarm system 40 of the lubrication system 10 can take a variety of forms. The signals can be local at the reservoir 20 as well as in the operator cab of the vehicle 15. The signals can also include a wireless signal to a remote location for additional consideration by other operator personnel. For example, a signal, specific to a certain vehicle, could be wirelessly communicated to a central location. At the central location, operating personnel could dispatch a fill vehicle accordingly to perform the refill process.

Figure 13A:
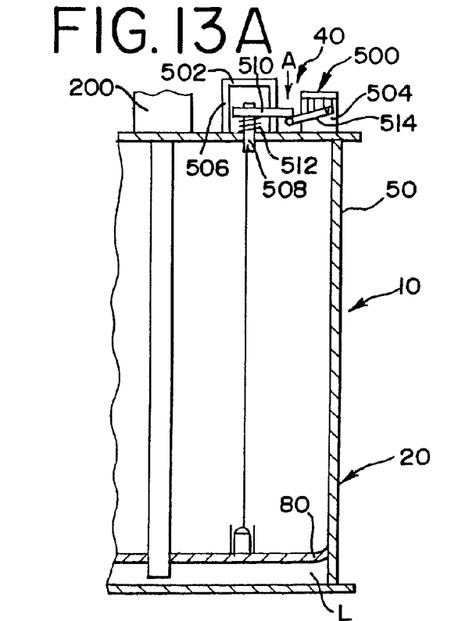
FIG. 13A is a partial schematic view of an alternative embodiment of a switch used in a low-level alarm of the present invention.
Figure 13B:
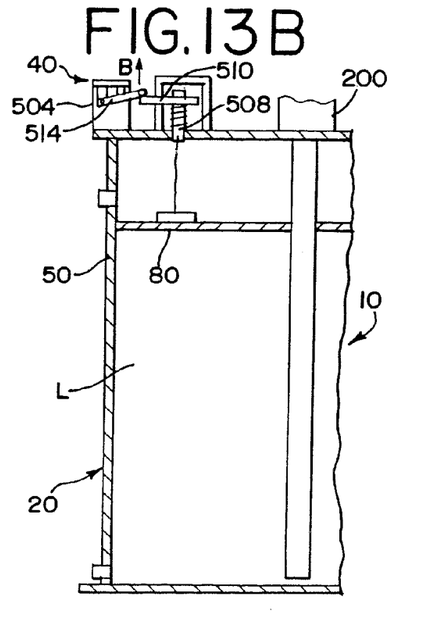
FIG. 13B is a partial schematic view of an alternative embodiment of a switch used in a high-level alarm of the present invention.

FIGS. 13A-B and 14A-B disclose alternative embodiments of switch mechanisms that can be used in the alarm system 40 of the present invention. FIG. 13A shows a switch mechanism 500 configured in a low-level alarm system. The switch 500 generally includes an activation assembly 502 and a switch 504. The activation assembly has a housing 506 that houses a moveable member 508 having an activation rod 510. Similar to the structures above, the moveable member 508 is biased by a spring 512. It is understood that the housing 506 has a slot to accommodate the activation rod 510. The moveable member 508 is connected to a weight assembly as described above. The switch 504 has an arm 514 and appropriate open and closed contacts. It is understood that the switch 504 is appropriately powered. The arm 514 is positioned adjacent and underneath the activation rod 510. It is understood that the switch mechanism 500 as used in a low-level alarm operates similar as described above. Generally, as the follower 80 moves downward in the body 50 as lubricant L is pumped from the body 50, the weight assembly moves the moveable member 508 and activation rod 510 downward (Arrow A) wherein the rod 510 engages the arm 514 to move the switch 504 to a closed position. FIG. 13B discloses the switch mechanism 500 configured in a high-level alarm. In this configuration, the switch arm 514 is positioned adjacent and above the activation rod 510. As discussed above, as the follower 80 moves upwards in the body 50, the rod 514 moves upwards (Arrow B) to engage the switch arm 514 and move the switch 504 to a closed position.

Figure 14A:
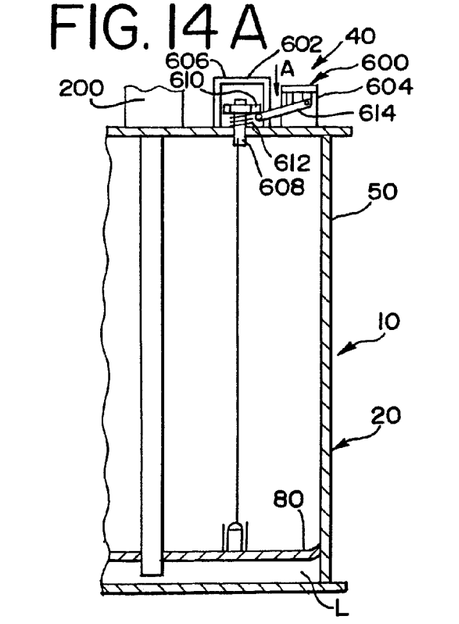
FIG. 14A is a partial schematic view of another alternative embodiment of a switch used in a low-level alarm of the present invention.
Figure 14B:
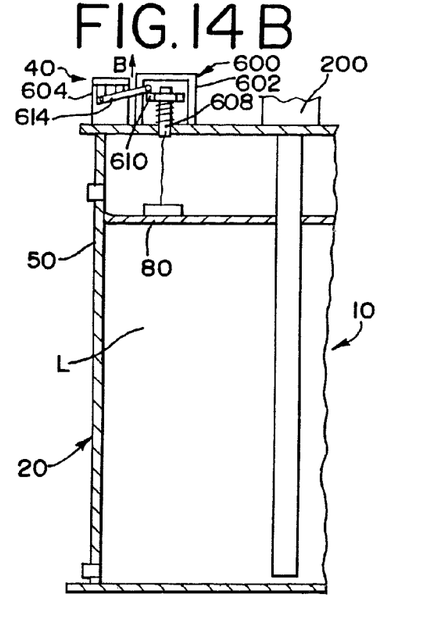
FIG. 14B is a partial schematic view of another alternative embodiment of a switch used in a high-level alarm of the present invention.

FIG. 14A discloses yet another embodiment of a switch mechanism that can be used in the alarm system 40 of the present invention. FIG. 14A shows a switch mechanism 600 configured in a low-level alarm system. Similar to FIGS. 13A and 13B, the switch mechanism 600 has an activation assembly 602 and a switch 604. The activation assembly 602 has a housing 606 that houses a moveable member 608 and rod 610. The rod 610 extends through an aperture of the moveable member 608. Similar to the structures above, the rod 610 is biased by a spring 612. It is understood that the housing 606 has a slot that will accommodate a portion of the switch 604 as will be described below. The moveable member 608 is connected to a weight assembly as described above. The switch 604 has an arm 614 and appropriate open and closed contacts. It is understood that the switch 604 is appropriately powered. The arm 614 extends into the housing 606 through the slot as discussed above. The arm 614 is positioned adjacent and underneath the moveable member 608. It is understood that the switch mechanism 600 as used in a low-level alarm operates similar as described above. Generally, as the follower 80 moves downward in the body 50 as lubricant L is pumped from the body 50, the weight assembly moves the rod 610 and the moveable member 608 downward (Arrow A) wherein the rod 610 engages the arm 614 to move the switch 604 to a closed position. Once activated, it is understood that the follower 80 can continue moving as the rod 610 can move relative to the moveable member 608 because of the aperture. FIG. 14B discloses the switch mechanism 600 configured in a high-level alarm. In this configuration, the switch arm 614 is positioned through the slot in the housing 606 and adjacent and above the moveable member 608. As discussed above, as the follower 80 moves upwards in the body 50, the rod 610 moves upwards to move the moveable member 608 upwards (Arrow B) to engage the switch arm 614 and move the switch 604 to a closed position. Thus, it is understood that the alternative switch mechanisms operate in similar fashions as discussed above. The switch mechanisms can thus be used to indicate positions of the follower 80.

The lubrication system 10 of the present invention provides several advantages in several areas including performance, durability and safety. The system provides an electrical indication, based upon mechanical components of the system, when the lubricant level reaches a designated low point in the reservoir. After the low-level signal is generated, an operator has a set amount of normal operating time before the reservoir 20 is completely emptied of lubricant. This gives the operator an opportunity to arrange for a lubricant fill vehicle to come and re-fill the reservoir before the reservoir is completely emptied. This reduces and minimizes the chance that an operator may completely empty the reservoir that can allow the pump to inject air into the system causing complete system failure, including injector malfunction. Repairing such failure is costly and requires removing the system from service for an extended period. Once the failure is addressed, the overall system on the vehicle must be refilled with lubricant. Avoiding this failure permits the operator to finish the work shift and not lose lubrication system function. It further allows the operator to plan for a re-fill at an appropriate time such as during a shift change. Also, with the system 10, the follower continues to move once the low-level alarm signal is generated. This movement allows the follower to continue to function properly and minimizes voids in the lubricant level at the inlet of the pump when the lubricant level approaches its lowest level in the reservoir. This minimizes the chances for further pump malfunction.

The system 10 further allows for refilling the reservoir without having to open the reservoir such as by removing the top. The system further allows for automatic interruption of the supply of lubricant during refilling once the reservoir has been filled to the proper full level. This allows for optimal usage of lubricant and minimizes waste of lubricant. In addition, by keeping the reservoir sealed and refilling from a remote, external filtered pump sight, contaminants are kept out of the lubricant system including the reservoir, pump assembly and other components of the system. The associated alarms further increase the life of the total system.

In addition, the shorter height of the reservoir places less stress on the walls of the reservoir and vehicle platform structure. This lower height also maintains operator vision because it does not extend past guard rails of the vehicle. The operator's lines of sight are, therefore, not obstructed by the system 10 while the system 10 also provides for an increase operating volume.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

While specific embodiments have been illustrated and described, numerous modifications may come to mind without significantly departing from the spirit of the invention, and the scope of protection is only limited by the scope of the accompanying Claims.

What is claimed is:

1. A lubrication reservoir comprising:
    a body having an inner surface and configured to hold a lubricant;
    a follower moveable within the body, the follower having a periphery, wherein the entire periphery engages the inner surface; and
    an alarm operably associated with the follower, wherein the alarm generates a signal when the reservoir has a predetermined amount of usage time remaining, indicating that the body is nearing a condition of being emptied of lubricant,
    wherein the alarm comprises an electrical switch positioned proximate a top of the body, the switch having a spring-loaded rod, and a weight connected to the rod by a cable, the weight associated with the follower wherein as the follower moves to a predetermined position, the rod moves to a position to generate the signal.

2. The reservoir of claim 1 wherein the predetermined amount of usage time remaining is at least one minute.

3. The reservoir of claim 1 wherein the predetermined amount of usage time remaining is selected from the group consisting of at least five minutes, at least thirty minutes, at least one hour, at least six hours, at least twenty-four hours, and the length of a work shift.

4. The reservoir of claim 1 wherein the follower is able to move toward a bottom portion of the body after the signal has been generated.

5. The reservoir of claim 1 wherein the follower has a sleeve that moveably receives the weight.

6. The reservoir of claim 1 further comprising a pump operably coupled to the reservoir.

7. The reservoir of claim 1 wherein the periphery of the follower comprises a circumferential lip that engages the inner surface.

8. A lubrication reservoir comprising:
    a body having an inner surface defining a cavity adapted to contain a lubricant, wherein the body comprises a fill port adapted to communicate a supply of lubricant to the cavity;
    a follower moveable within the body between a lower position and an upper position, the follower having a periphery positioned in confronting relation to and engaging the inner surface;
    a first alarm operably associated with the follower, wherein the first alarm generates a signal when reservoir has a predetermined amount of usage time remaining; and
    a second alarm operably associated with the follower, wherein the second alarm is configured to automatically interrupt the supply of lubricant through the fill port when the follower is proximate the upper position.

9. The reservoir of claim 8 wherein the first alarm comprises a first spring-loaded rod and a first weight interconnected by a first cable, and further comprises a first electrical switch, wherein first spring-loaded rod is operably associated with first electrical switch; and wherein the second alarm comprises a second spring-loaded rod and a second weight interconnected by a second cable, and further comprises a second electrical switch, wherein second spring-loaded rod is operably associated with second electrical switch.

10. The reservoir of claim 9 further comprising a receiving sleeve disposed on a side of the follower proximate to a top portion of the body, wherein the receiving sleeve is adapted to receive the first weight, and wherein the follower and the first weight are not permanently connected.

11. A lubrication reservoir comprising:
    a body defining a cavity adapted to contain a lubricant, wherein the body has a fill port adapted to communicate a supply of lubricant to the cavity;
    a follower moveable within the body; and
    a shut-off system having a shut-off valve, the system being in fluid communication with the fill port and operably associated with the follower, wherein the system is configured to automatically interrupt the supply of lubricant through the fill port when the follower is at a predetermined location in the body by sending a signal to close the shut-off valve.

* * * * *